US006934405B1

(12) United States Patent
Schuessler

(10) Patent No.: US 6,934,405 B1
(45) Date of Patent: Aug. 23, 2005

(54) ADDRESS READING METHOD

(75) Inventor: Michael Schuessler, Constance (DE)

(73) Assignee: Siemens Aktiengesellschaft, Munich ( * ) Notice: Subject to any disclaimer, the term of this patent is extended or adjusted under 35 U.S.C. 154(b) by 0 days.

(21) Appl. No.: 09/959,921

(22) PCT Filed: Apr. 4, 2000

(86) PCT No.: PCT/DE00/01038

§ 371 (c)(1),
(2), (4) Date: Nov. 13, 2001

(87) PCT Pub. No.: WO00/70549

PCT Pub. Date: Nov. 23, 2000

(30) Foreign Application Priority Data

May 12, 1999 (DE) ................................ 199 21 953

(51) Int. Cl.⁷ ............................................. G06K 9/00
(52) U.S. Cl. ..................... 382/101; 382/159; 382/201;
382/230; 382/187; 706/20; 209/584
(58) Field of Search ............................... 382/101, 159, 382/187, 228, 229, 253, 181, 230, 201; 209/584, 209/900; 705/401; 706/20

(56) References Cited

U.S. PATENT DOCUMENTS

| | | | | |
|---|---|---|---|---|
| 5,056,147 A | * | 10/1991 | Turner et al. | ................ 382/159 |
| 5,063,521 A | * | 11/1991 | Peterson et al. | ............... 706/34 |
| 5,113,453 A | * | 5/1992 | Simon | ........................ 382/202 |
| 5,710,830 A | * | 1/1998 | Holeva | ........................ 382/173 |
| 5,768,421 A | * | 6/1998 | Gaffin et al. | ................. 382/209 |
| 5,774,588 A | | 6/1998 | Li | |
| 5,940,535 A | | 8/1999 | Huang | |
| 6,009,199 A | * | 12/1999 | Ho | ............................. 382/224 |
| 6,205,247 B1 | * | 3/2001 | Breuer et al. | ............... 382/228 |
| 6,246,794 B1 | * | 6/2001 | Kagehiro et al. | ........... 382/185 |
| 6,535,619 B1 | * | 3/2003 | Suwa et al. | .................. 382/101 |
| 6,625,317 B1 | * | 9/2003 | Gaffin et al. | ................. 382/209 |
| 2002/0042785 A1 | * | 4/2002 | Raz | ............................. 706/20 |

FOREIGN PATENT DOCUMENTS

| | | |
|---|---|---|
| DE | 196 12 465 | 10/1997 |
| DE | 197 05 757 A1 | 5/1998 |

OTHER PUBLICATIONS

Yuan-Kai Wang et al., "Applying Genetic Algorithms on Pattern Recognition: an Analysis and Survey", *IEEE Proceedings of ICRP*, 1996, pp. 740-744.
H. Neimann, "Klaseifikation von Mustern," Springer-Verlag, 1983, pp. 164-179 and 222-231.

* cited by examiner

*Primary Examiner*—Bhavesh M. Mehta
*Assistant Examiner*—Barry Choobin
(74) *Attorney, Agent, or Firm*—Jacob Eisenberg; Siemens AG

(57) ABSTRACT

An address reading method with processing steps controlled by parameters, in which free parameters which cannot be adapted by learning samples are to be automatically optimized. These parameters are therefore assigned costs. The value of free parameters which are expensive and lie above selectable cost thresholds are maintained and the remaining free parameters are improved by repeatedly modifying their values on the basis of strategies known per se, taking already evaluated parameter settings into account, and training and evaluating the reading method only with these modified values.

10 Claims, 3 Drawing Sheets

ADDRESS READING METHOD

BACKGROUND OF THE INVENTION

Address reading systems have the task of recognizing the characters and numbers from the text elements located on items of mail, such as letters or packages, specifically from the area of the addressee's address, and of deriving sorting information from among them. For this purpose, a series of recognition methods are used, which after scanning of the item analyze the resultant electronic image step-by-step and classify its elements, in order finally to produce the information relevant for sorting in the form of electronic text. The substeps involved are, specifically, layout analysis (recognition of the type of item, determination of the regions of interest (ROI), segmentation of the text image into lines, words and/or characters), character classification or identification of joined-up handwriting, and final interpretation of the text elements.

The functional operation of each recognition method is controlled by parameters. Many of these parameters can be appraised/learned/trained by means of predetermined mathematical optimization criteria during a learning phase; they are referred to hereafter as trainable parameters. For all the other parameters, referred to hereafter as free parameters, there are no such optimization criteria. Both for the appraisal of trainable parameters and for the setting of free parameters, what are known as random samples are required from items taken as examples. Each random sample element is made up of a detail of the item image and the required correct solution (label, desired result). There are random samples for the address reading system as a whole, which are made up in each case of a complete item image and the sorting information. There are also random samples for the individual recognition methods (method-specific samples), which are made up in each case of the input image of the recognition method and its required output. A distinction is made between learning samples and test samples: learning samples are required for the appraisal of trainable parameters. Test samples serve for the evaluation of the performance of the trained recognition method. One possibility for the suitable setting of free parameters is the repeated evaluation of the performance of the recognition method with different parameter values. This operation is also referred to as optimization of the free parameters, even if the prime concern is not to find the global optimum in the mathematical sense but to achieve a good recognition performance within a limited time.

The state of the art is that free parameters of address reading systems are set by manual, repeated trial and error. The various parameter settings are assessed by the developer partly using heuristic criteria, partly using evaluations of the respective recognition method on method-specific test samples and partly using evaluations of the reading system as a whole on test samples. In addition, there are individual published papers in the area of pattern recognition systems which are aimed at an automation of this process. They use mathematical optimization methods for setting selected free parameters, the theory of which is described for example in [Press et al.: Numerical Recipes in C, Cambridge University Press, 1992], [D. E. Goldberg, Genetic Algorithms in Search, Optimization & Machine Learning, Addison-Wesley, 1989], [I. Rechenberg, Evolutionsstrategien [evolution strategies] '94, Frommann-Holzboog, 1994]. Special evolutionary/genetic algorithms are often used in this case. In the general article [Applying Genetic Algorithms on Pattern Recognition: An Analysis and Survey, Y.-K. Wang and K.-C. Fan, in Proceedings of the International Conference on Pattern Recognition, 1996], a distinction is made between three types of problems: firstly the optimization of the selection of characteristics, secondly the optimization of the classification function and thirdly the optimization of the classification learning. Further papers on genetic optimization of pattern recognition systems can be found in the special issue [Pattern Recognition Letters: Special Issue on Genetic Algorithms, Vol. 16, No. 8, August 1995]. The procedure adopted in these publications can be summarized as follows:

1. choose one or more different settings of the free parameters, taking already evaluated parameter settings into account,
2. evaluate the parameter setting(s) on the basis of a test sample,
3. if the performance aimed for is achieved, then END, otherwise go to 1.

Transferred to a recognition method within an address reading system, this would mean that the method would have to be completely trained for each evaluation of a parameter setting in order for it then to be possible to measure its performance on a test sample.

The individual recognition methods in an address reading system are distinguished by the fact that large learning samples are necessary for their training. It is not uncommon for the complex calculations during training to take several hours on modern workstation computers. The technique described above of using mathematical optimization methods is consequently only suitable in a very qualified sense for the optimization of free parameters of address reading methods, since it would, on average, take many months of computing time to achieve good results.

SUMMARY OF THE INVENTION

The invention specified in claim 1 is therefore based on the object of providing an address reading method in which free parameters of address reading systems can be optimized automatically and at low cost with the aid of strategies known per se. Advantageous refinements of the invention are presented in the subclaims.

The method described here automates and systemizes the process of setting free parameters of address reading methods and consequently makes better results possible than with conventional optimization methods. It makes intensive use of the fact that recognition methods in address reading systems can be broken down into a number of substeps. In general, the free parameters can also be assigned to individual substeps, so that a structuring is carried out as follows:

after each substep of the recognition method, the processed data are buffer-stored (for example the processed images of the sample and/or sets of trained parameters). The data are retained until they are overwritten when the substep is called up again. If free parameters are only to be modified after an evaluation has already taken place, the execution of the substeps may be commenced at the point where these parameters occur for the first time; it is not imperative to run through a complete learning and testing phase of the recognition method from the beginning. In this way, considerable amounts of computing time can be saved.

The free parameters are therefore assigned costs: a free parameter has low costs if, when modifying its value, only a small amount of computing time is incurred to evaluate the recognition method for the new value; this also means that the substep(s) which is/are influenced by the parameter is/are relatively far back in the sequence of executing the substeps.

Conversely, a free parameter has high costs if the evaluation of its new value requires a large amount of computing time and the sequence of executing the substeps is to be run through from relatively far forward.

The optimization method consequently proceeds as follows: at the beginning, at least one complete evaluation of the recognition method is carried out with any chosen free parameters. This serves for initializing the buffer-stored data. From the set of free parameters, expensive parameters are chosen and their values are maintained. All the other free parameters are then improved on the basis of a customary mathematical optimization method, in that—firstly—their values are repeatedly modified, taking already evaluated parameter settings into account, and—secondly—these modified values are used for training and evaluating the recognition method. It is not imperative here for the training and evaluation to begin from the start, reverting instead to the buffer-stored data. Once parameter settings have been evaluated a number of times, a new set of expensive parameters is chosen and their values maintained; for example, some of the previously maintained parameters are then cleared and included in the optimization. Again, an optimization method for improving the parameter values is used for a time, then choosing is repeated, and so on. This procedure allows considerably more parameter settings to be evaluated in a certain time than was possible by the previous procedure.

The costs can be determined through the expected computing time as from the earliest processing step of which the free parameters are modified.

It is also advantageous to read the addresses by means of classification methods, the performance of which is the recognition rate.

In an advantageous refinement, the cost thresholds of the lowest parameter costs in relation to the highest parameter costs and/or vice versa are modified to ensure a systematic evaluation providing an overview. To keep the evaluation simple, it is also favorable to assign each free parameter to only one processing step, the parameters of a processing step having the same costs, and/or to vary at the same time only free parameters with the same costs.

It is advantageous to modify the free parameters on the basis of an evolution strategy. In this case, at least two different parameter-value allocations are used as parents to generate a number of offspring, of which at least two offspring with the best performances are selected as new parents, etc. All the steps of the learning and testing phases then only have to be run through for as many offspring as were previously selected as new parents.

The performances to be assessed may be both the performances of the recognition method concerned, such as for example ROI finding or handwriting recognition, and the performance of the reading system as a whole.

BRIEF DESCRIPTION OF THE DRAWINGS

The invention is now explained in more detail in an exemplary embodiment with reference to the drawings, in which.

DETAILED DESCRIPTION OF THE INVENTION

One component in an address reading system is a recognition method for handwritten words. Its input is a word image and a list of permissible words, for example names of towns or street names. Expected as the output is the best-matching assignment of the word image to one of the permissible words, i.e. a classification of the word.

Figure 1:
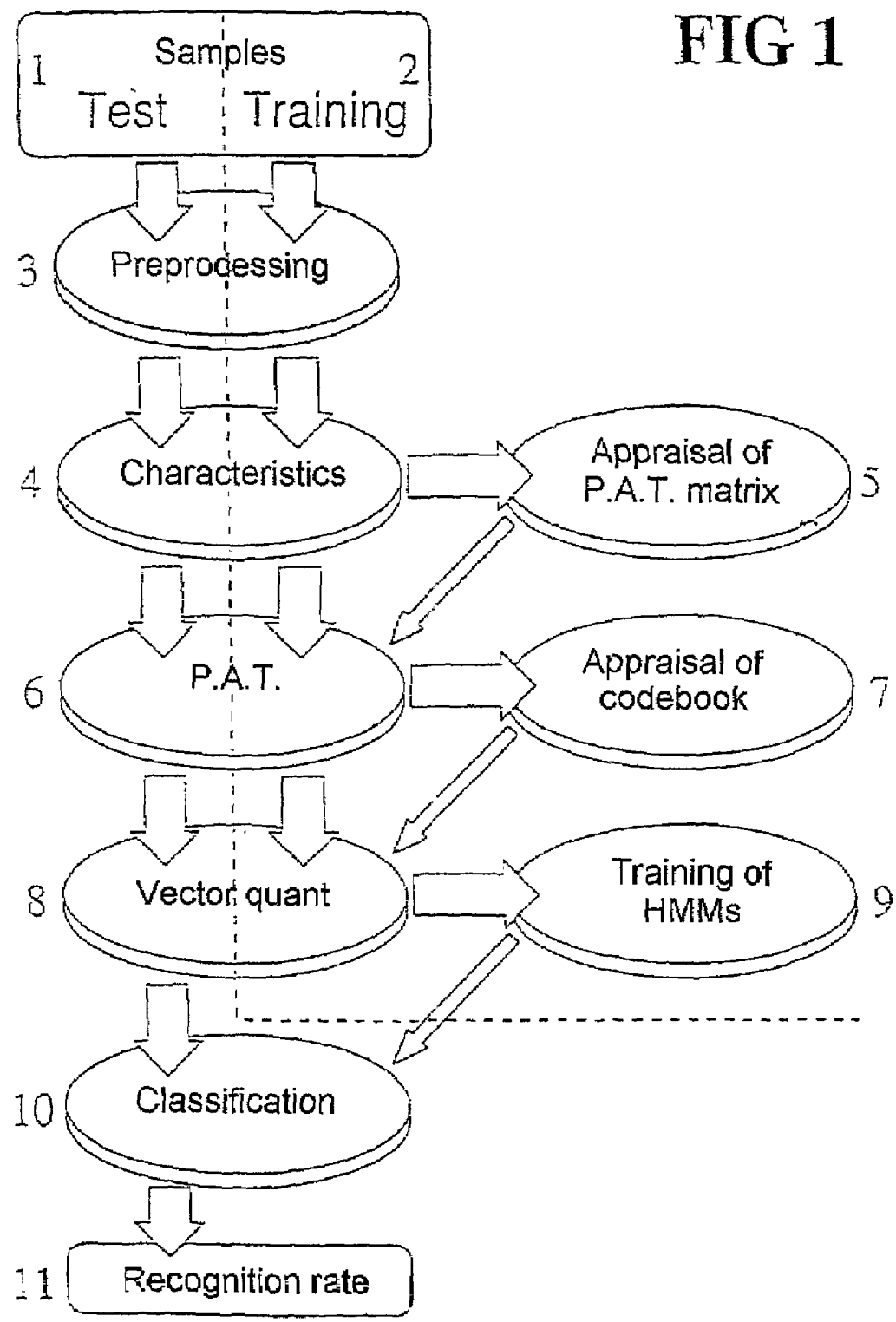
FIG. 1 shows a flow diagram for the reading of handwritten addresses

The handwriting reading system considered in this example is based on a stochastic modeling with what are known as hidden Markov models (HMMs). FIG. 1 shows the sequence and the essential modules of the handwriting reading system and its integration into a development environment. An image from a random sample runs through at least the following steps: firstly, the image of the handwritten word is preprocessed. The preprocessing 3 includes a normalizing of the script with respect to position, size and inclination and also an elimination of noise, for example underlinings. A sequence of characteristic vectors 4 is subsequently calculated from the preprocessed image by passing a characteristic window over the image step-by-step from left to right. The dimension of the characteristic vectors is reduced by a principal axis transformation P.A.T. 6. Finally, the vectors are vector-quantized 8, i.e. represented by a weighted sum of the normal distributions of the codebook.

In the development of the system there are two phases, which have to be repeatedly run through: the learning phase and the testing phase. In FIG. 1, the learning phase is represented to the right of the broken line, the testing phase is represented to the left of it. In the learning phase, the system is trained for the recognition task. For this purpose, an extensive learning sample 2 of images of handwritten words and their transliteration (representation of the word in electronic text form) is available. Large sets of parameters are appraised from statistics of the learning sample, for example the principal axis transformation matrix 5, the codebook 7 and the HMM model parameters 9 (cf. FIG. 1). In the testing phase, the trained system is tested for its performance capability, i.e. it is evaluated how well it can read handwritten words. The evaluation takes place on the basis of a test sample 1 of images of handwritten words and their transliteration. Each image of the test sample is presented to the system for classification 10. The result of each classification 10 is compared with the transliteration of the image; consequently, it is decided for each image whether it was correctly or incorrectly classified (recognized). The proportion of correctly classified word images throughout the entire test sample is determined (recognition rate 11, cf. FIG. 1); this provides a measure of the recognition performance of the system.

The handwriting recognition system comprises a number of processing steps. Some run only in the learning phase of the system (appraisals from statistics), others only in the testing phase (classification and calculation of the recognition rate); all the others are transformations of the form of representation of the word images which are run through both by the learning images and the test images (preprocessing, characteristic extraction, characteristic reduction, vector quantization).

All the processing steps include a number of parameters with which their functional operation can be controlled.

Even processing steps of the learning phase, which themselves statistically appraise large amounts of parameters, are in turn influenced in their functional operation by parameters.

For example, in the codebook appraisal 7, the mean values and covariance matrices of a number of normal distribution densities are statistically appraised; how large this number is to be must be predetermined, however.

These parameters are then divided into trainable parameters and free parameters. The values of the trainable parameters are obtained from statistical appraisals; they are not considered any further here. For the free parameters, on the other hand, it is unclear how their values are to be chosen. Some examples of free parameters are:

Preprocessing 3
normalized height of lower-case letter range, ascender and descender range; special method parameters Characteristic Calculation 4
width and step increment of the characteristic window; number of characteristics; type of characteristics Codebook Appraisal 7
number of normal distribution densities; type of appraisal method; special method parameters HMM Training 9
number of model states for each letter; type of context modeling; special method parameters.

The correct setting of the free parameters is of decisive significance for the performance of the handwriting recognition system. The aim is to find values for the free parameters with which the handwriting recognition system achieves a good recognition performance. There are a large number of mathematical optimization methods which find the optima of an assessment function problem-independently. Their procedure is to evaluate the assessment function repeatedly for different input values and use an ingenious way to derive new input values from the functional values. Examples of such optimization methods are gradient descent, simplex methods, simulated annealing and evolutionary algorithms.

Theoretically, it would be possible to optimize all the free parameters of the handwriting recognition system simultaneously by such an optimization method. The assessment function is the recognition rate on the test sample. To evaluate the assessment function for an actual set of parameters, first of all the learning phase of the system must be carried out completely and subsequently the testing phase must be carried out. In the handwriting recognition system considered here, a single such evaluation takes up to 20 hours on a modern powerful workstation computer, because the individual processing steps involve elaborate calculations. Depending on the number of free parameters, however, evaluations in their hundreds to several thousands are necessary to achieve a satisfactory result. Consequently, a single optimization run would require a computing time of several months to years, which is completely unfeasible in practice.

The method described below reduces the computing time requirement considerably. It makes use of the structure of the handwriting recognition system in a suitable way to reduce the computing times for individual evaluations. After each processing step in the handwriting recognition system, for example the preprocessing or the appraisal of the codebook, the processed data are buffer-stored (for example the preprocessed images or the appraised codebook). The data are retained until they are overwritten when the processing step is called up again. If, after an evaluation which has already taken place, only a single parameter value is to be modified, the execution of the processing steps can then be commenced at the point where this parameter occurs for the first time; it is not imperative to run through a complete learning phase and testing phase of the system. If, for example, the number of codebook classes is to be changed, it is possible to revert to the already existing reduced characteristic vectors. Considerable amounts of computing time can be saved in this way.

The costs $C(P_i)$ of a parameter $P_i$ are then defined as an appraisal of the computing time which is required for the evaluation of the system if only the value of this parameter was modified. The precision of this appraisal is in this case of secondary significance; what is decisive is the ordering of the parameters according to their costs, which can be derived from this.

For example, the parameters of the preprocessing are considerably more expensive than the parameters of the HMM training. The parameters are grouped according to their costs. The free parameters of each processing step are combined in one group. The idea of the method described is in each case to keep expensive parameter groups constant for a time and only optimize the inexpensive ones.

The optimization of the free parameters of the handwriting recognition system, taking their costs into account and using interim results, is shown on the basis of an example which makes use of evolution strategies.

Evolution strategies are a subclass of the evolutionary algorithms and are based in their procedure on natural evolution. The concept of evolution strategy is used here as in [I. Rechenberg, Evolutionsstrategien'94, Frommann-Holzboog, 1994]. In a way analogous with biology, each parameter allocation is interpreted as a unique identification and as a genotype (gene) of an individual. A group of individuals is called a population. One or a few primary individuals, which may be randomly generated parameter-value allocations for example, are taken at the beginning. The primary individuals, as parents, generate a population of offspring individuals (recombination). Each new individual is generated by a mixture of the genes (parameter-value allocations) of two parents (crossover) and by slight random modifications in the gene produced (mutation). The fitness of the new individuals is then determined, i.e. their quality is assessed on the basis of an evaluation of the system to be optimized with their parameter-value allocation. The individuals with the greatest fitness are selected (selection), to become parents of a new generation, while the others die (survival of the fittest). This process of generation, assessment and selection of individuals can be repeated for as long as desired.

The set of free parameters is referred to as $F=\{P_i | i=1 \ldots N\}$. They are combined according to their costs in K groups $F_k=\{P_i | C(P_i)=c_k\}$, $k=1 \ldots K$; K is the number of processing steps of the handwriting recognition system. On the basis of an actual example, the procedure is as follows (see FIG. 2): 20 individuals (parameter-value allocations) are generated entirely randomly within their permissible value ranges. In the figure, each individual is identified by a rectangle, which represents the vector of its parameter values. For each individual, first of all the training phase and subsequently the testing phase of the handwriting recognition system is run through.

Figure 2:
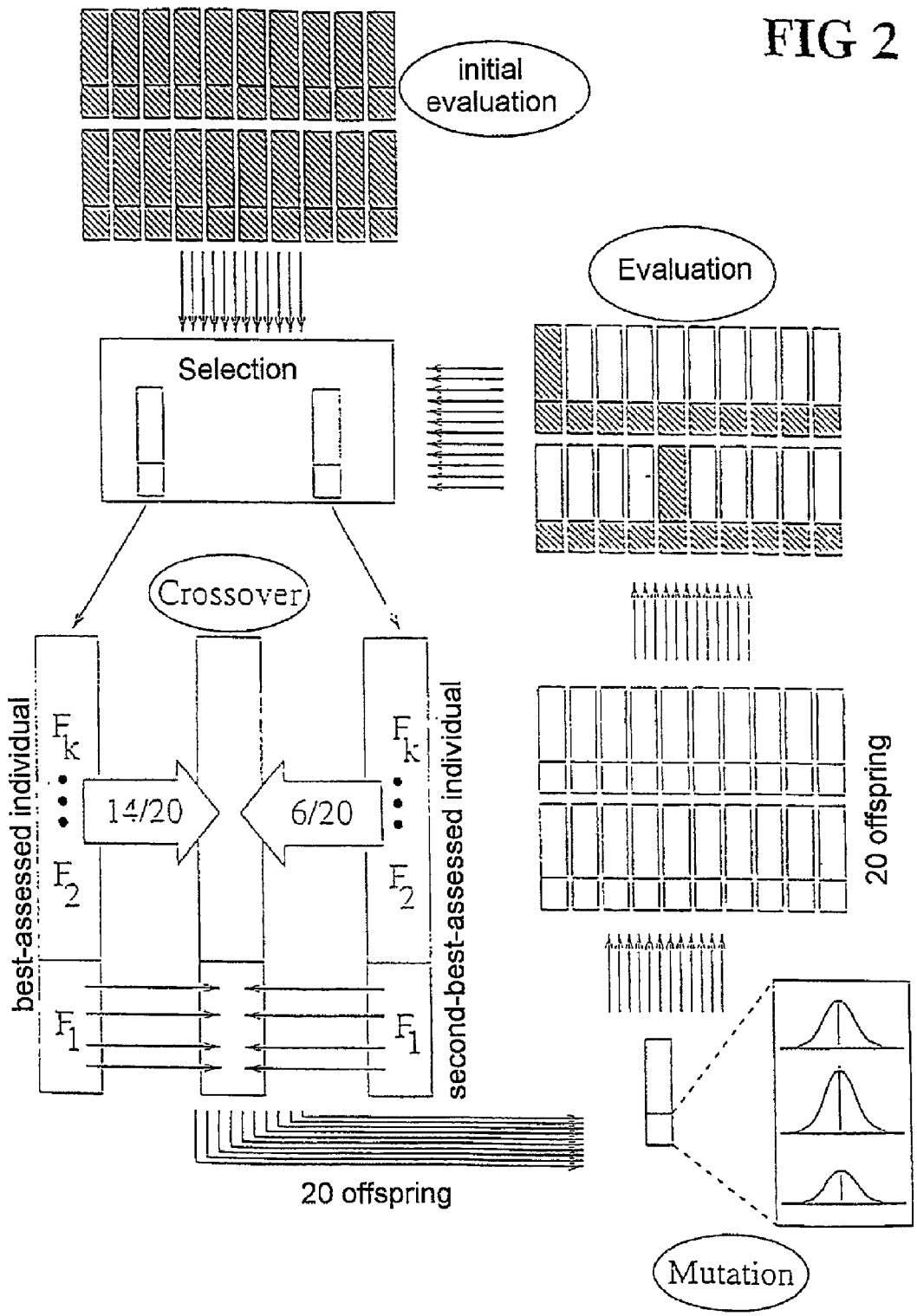
FIG. 2 shows a schematic representation of the evolutionary optimization of the free parameters of the classification of a handwriting reader

In FIG. 2, the initial individuals are completely filled in with lines, because training and testing phases have to be completed in full for their evaluation—initial evaluation—. After that, a recognition rate is fixed for each individual. The two individuals with the highest recognition rate are considered further—selection—; they are the parents for the next generation.

Then, firstly, the processing step of the classification is improved. Free parameters of the classification are, for example, the width of the search beam and a rejection threshold value. The two parents generate 20 offspring by the following special crossover operation: 14 offspring inherit the value allocation of all the parameters not belonging to the classification from the best-assessed parent, 6 inherit it from the second-best-assessed parent. This is indicated in FIG. 2 by the wide arrow. Then, the values of the parameters of the classification still have to be fixed for all 20 offspring. For each classification parameter it is individually decided non-deterministically whether the offspring receives the parameter value from the first parent or from the second parent. In this case, the best-assessed parent is chosen with a probability of 14/20; the second-best-assessed parent is chosen with a probability of 6/20. This is indicated in FIG. 2 by the individual thin arrows.

The 20 offspring then undergo a mutation. The values of the classification parameters for each of the 20 offspring are individually modified slightly within their permissible value range in a random way. Used as the random function is a normal distribution, the main value of which is the current value of the parameter.

Next, the 20 offspring must be evaluated. Firstly, the 14 offspring which have inherited the value allocation of all the non-classification parameters from the best-assessed parent are evaluated. Only in the evaluation of the first offspring is it necessary on this one occasion to run through all the processing steps of the handwriting recognition system (training and testing phases); the remaining 13 differ only in the classification parameters, therefore it is also only necessary to run through the classification for each offspring. This is indicated in FIG. 2 by the regions of the parameter vectors (individuals) filled in with broken lines. Subsequently, the remaining 6 offspring are evaluated; the same applies to them as to the first 14.

As already at the beginning, the 2 best individuals from the 20 individuals assessed are then selected as parents of a new generation (selection). By crossover and mutation, they in turn generate 20 offspring, which are assessed, etc. For a certain number of generations, only the classification parameters are optimized. Then, their good values are "frozen", and the parameters of the previous processing step, that is the HMM training, are optimized.

Figure 3:
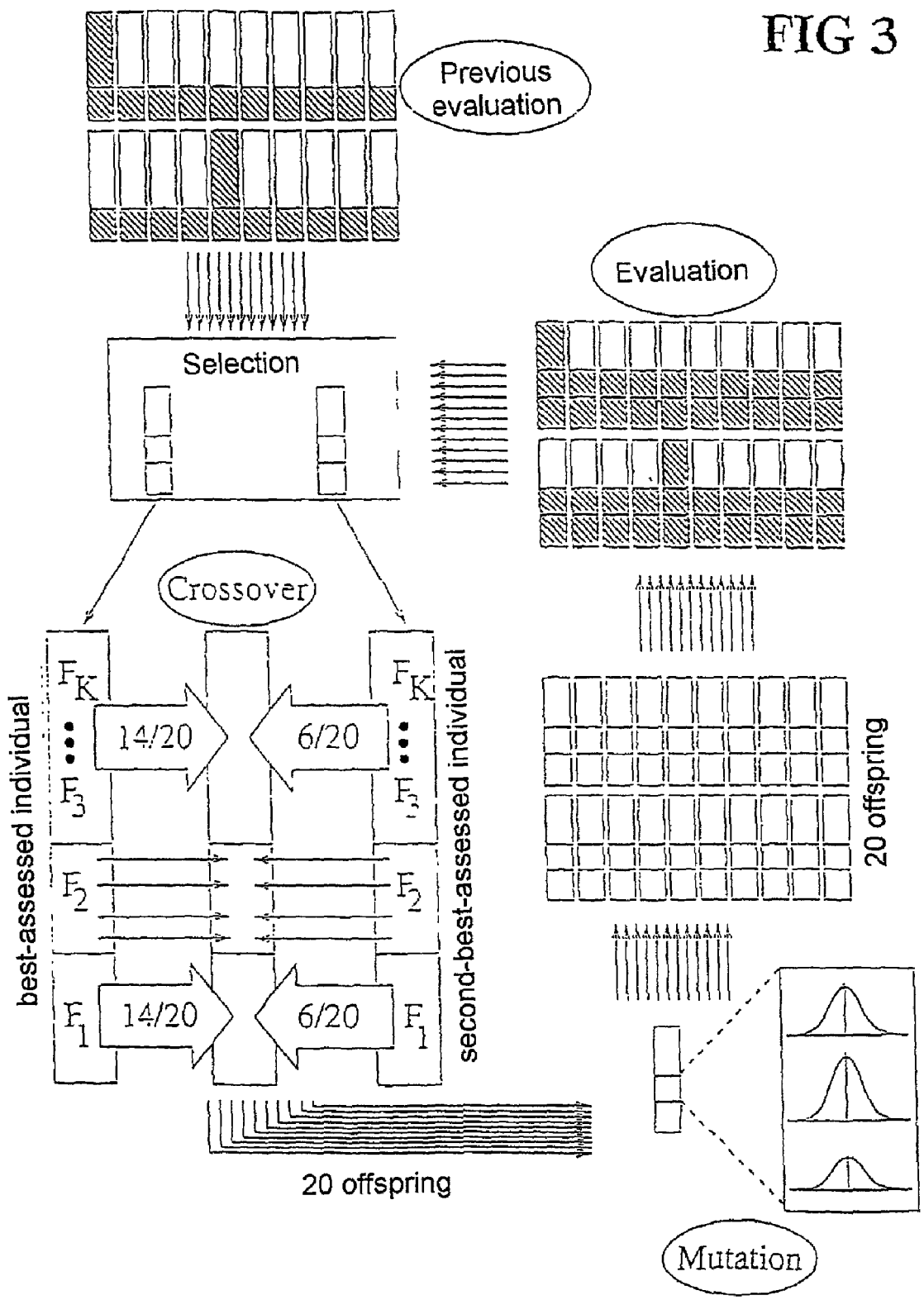
FIG. 3 shows a schematic representation of the evolutionary optimization of the free parameters for the HMM training of a handwriting reader.

Then the processing step of the HMM training is improved (see FIG. 3). Free parameters of the HMM training are, for example, the number of model states for each letter, the type of context modeling and specific method parameters. The two parents generate 20 offspring by crossover: 14 offspring inherit the value allocation of all the parameters not belonging to the HMM training from the best-assessed parent, 6 inherit it from the second-best-assessed parent. This is indicated in FIG. 3 by the wide arrow. Then the values of the HMM training parameters still have to be fixed for all 20 offspring. For each HMM training parameter it is individually decided non-deterministically whether the offspring receives the parameter value from the first parent or from the second parent. In this case, the best-assessed parent is again chosen with a probability of 14/20, the second-best-assessed parent is chosen with a probability of 6/20. This is indicated in FIG. 3 by the individual thin arrows.

The 20 offspring undergo a mutation. The values of the HMM training parameters for each of the 20 offspring are individually modified slightly within their permissible value range in a random way. Used as the random function is a normal distribution, the main value of which is the current value of the parameter.

Next, the 20 offspring are evaluated. Firstly, the 14 offspring which have inherited the value allocation of all the non-HMM training parameters from the best-assessed parent are evaluated. Only in the evaluation of the first offspring is it necessary on this one occasion to run through all the processing steps of the handwriting recognition system (training and testing phases); the remaining 13 differ only in the HMM training parameters. For each of these 13 it is necessary to run through the HMM training and the classification. This is indicated in FIG. 3 by the regions of the parameter vectors (individuals) filled in with broken lines. Subsequently, the remaining 6 offspring are evaluated; the same applies to them as to the first 14.

Again, the 2 best individuals from the 20 individuals assessed are selected as parents of a new generation (selection). By crossover and mutation, they in turn generate 20 offspring, which are assessed, etc.

For a certain number of generations, only the HMM training parameters are optimized. Then, their good values are also "frozen", and the parameters of the previous processing step, that is the vector quantization, are optimized. This procedure is continued with the optimization of the codebook appraisal, the principal axis transformation and so on up to the preprocessing. Then, the classification is begun again, and the classification parameters are in turn optimized for a time, and so on.

The number of generations for the optimization of each parameter group is chosen in dependence on the number of parameters in this group and the overall progress of the optimization. At the beginning of the optimization, for example, a group with 3 parameters is optimized over 3 generations.

Once all the groups have been optimized once and Fk is again reached, they are optimized over 4 generations, the next time 5 generations, etc. A group with 4 parameters is optimized over 4 generations, then over 5, etc.

In addition, it is also meaningful to adapt the size of the population to the number of parameters in the group. In the case of a group with 3 parameters, instead of 20 offspring only about 15 should be generated; in the case of a large group with 6 parameters, on the other hand, about 30.

Until now, only the recognition rate of the handwriting recognition system on a test sample has been used in the exemplary embodiment as a criterion for the assessment of parameter settings. Since the handwriting recognition system is only one recognition method of a number within the address reading system, it also makes sense to use the reading performance of the address reading system as a whole as a criterion for assessment too. It is generally a much more complex undertaking to determine the reading performance of the address reading system as a whole than that of individual recognition methods; on the other hand, the aim of the parameter optimization is to improve the address reading system as a whole. Therefore, it is meaningful to determine from time to time the reading performance of the address reading system as a whole and to use this to make decisions on how to proceed with the optimization, for example whether the reading performance aimed for has already been achieved and the optimization can be discontinued, or on the choice of a new group of parameters.

What is claimed is:

1. An address realing method with at least two processing steps controlled by parameters, which is optimized by means of learning and testing phases, parameters being automatically adapted by learning methods known per so on the basis of a learning sample and the performance of the address reading being determined on the basis of a test sample with the parameters from the learning phase, each processing step receiving as an input the values of its parameters and processed and stored data from previous processing steps, at least one processing step receiving the random sample elements as the necessary input and one processing step producing the reading result as a performance, characterized by the following steps:

all free parameters which cannot be automatically adapted in the learning phase with the learning sample are assigned costs;

fixing of a cost threshold;

modification of a number of free parameters lying below the cost threshold on the basis of an optimization strategy known per se, taking all the already determined performances of parameter-value allocations into account;

execution of the learning phase on the basis of the learning sample, beginning with the earliest processing step of which the free parameters have been modified;

execution of the testing phase on the basis of the test sample, beginning with the earliest processing step of which the parameters have been modified, and determination of the performance of the address reading for the current parameter values;

further modification on the basis of an optimization strategy of free parameters which lie below the fixed cost threshold and subsequent execution of the learning and testing phases until a fixed performance is achieved or until a fixed number of learning and testing phases are executed;

fixing of a new cost threshold and modification of one or more free parameters lying below the cost threshold on the basis of an optimization strategy and execution of the learning and testing phases with determination of the performance until a fixed performance is obtained or until a fixed number of learning and testing phases are executed;

modification of the cost thresholds and implementation of the steps described above until a fixed performance of the address reading as a whole has been achieved or fixed overall costs have been exceeded;

reading of current addresses with the adapted parameters.

2. The method as claimed in claim 1, characterized in that the costs arc determined through the expected computing time as from the earliest processing step of which the free parameters are modified.

3. The method as claimed in claim 1, characterized in that the addresses are read by means of classification methods, the performance of which is a recognition rate.

4. The method as claimed in claim 1, characterized in that the cost thresholds of the lowest parameter costs in relation to the highest parameter costs and/or vice versa are modified.

5. The method as claimed in claim 1, characterized in that each free parameter is assigned to precisely one processing step and the parameters of a processing step have the same costs.

6. The method as claimed in claim 5, characterized in that only free parameters with the same costs are varied at the same time.

7. The method as claimed in claim 1, characterized in that the free parameters are modified on the basis of an evolution strategy.

8. The method as claimed in claim 7, characterized in that, for a processing step or for the reading method as a whole, at least two different parameter-value allocations are generated and, as parents, generate offspring of one generation, of which at least two offspring with the best performances are selected and in turn serve as parents for a new generation, it only being necessary to run through all the steps of the learning and testing phases for as many offspring as were previously selected as new parents, and it only being necessary for the remaining offspring to run through the procedure as from the processing stage considered of the training and testing phases.

9. The method as claimed in one of claim 1, characterized in that the assessed performances when modifications are made for a certain cost threshold are the performances of the recognition method concerned.

10. The method as claimed in one of claim 1, characterized in that the assessed performances when modifications are made for a certain cost threshold are the performances of the address reading method as a whole.

* * * * *